Patented Jan. 8, 1946

2,392,801

UNITED STATES PATENT OFFICE 2,392,801

DIACETOXYMERCURINITRO GUAIACOL

Edgar A. Peterson, deceased, late of Baltimore, Md., by John A. Cochran, administrator, Baltimore, Md., assignor to Lynch and Company, St. Louis, Mo., a corporation of Missouri No Drawing. Application September 21, 1942, Serial No. 459,182

1 Claim. (Cl. 260—434)

This invention relates to the provision of 4.6 diacetoxy-mercuri-5 nitro guaiacol, which has valuable bactericidal and antiseptic properties.

Several mercurated substituted nitro phenols have heretofore been proposed for use as bactericides and antiseptics. However, it has been found that such mercurated compounds had, in general, so high a toxicity as to negative their use internally.

It has been found that certain of the mercurated mononitro monoalkoxy phenols, specifically the mercurated derivatives of 5-nitro guaiacol (I), contrary to what might have been expected, have so low a toxicity as to make them adaptable for internal (e. g., intravenous) use; at the same time, the products just identified have been found to possess a bactericidal potency or efficiency which is outstanding among mercurated substituted nitro phenols and which distinguishes said products from, for example, the corresponding mercurated 4-nitro-guaiacol heretofore proposed which was the subject of earlier work done in this general field.

Important members of the series of compounds that have been prepared in accordance with the present invention are the mercurated derivatives of 5-nitro-guaiacol, the probable structures of which are:

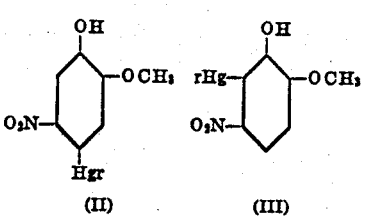

(where $r$ is a negative ion or radical; e. g., OCOCH$_3$, Cl, OH, or the like) and which have been prepared as follows:

A mixture of 2000 grams of guaiacol, 2200 grams of acetic anhydride, and 50 drops of concentrated sulphuric acid was refluxed for 3 hours. The acetic acid and excess acetic anhydride were distilled off under a water pump vacuum and the product distilled under a high vacuum through a fractionating column. The product was then purified by refractionating it under a high vacuum. B. P. 96–98°/1–2 mm. The guaiacol acetate weighed 2595 grams, 98% of the theoretical yield.

In the nitration step, 100 grams of the guaiacol acetate was added, dropwise, to 100 cc. of fuming nitric acid (sp. gr. 1.6 approx.) with stirring, the temperature not being allowed to rise above 20° C. The resulting solution was added to a mixture of ice and water, stirred well, and allowed to stand until the oil had partly crystallized. The aqueous acid mixture was decanted and the oily mass was washed several times with cold water. The oily product consisted essentially of a mixture of 3-nitro guaiacol acetate and 5-nitro guaiacol acetate, the latter being a crystalline product and the former an oil; the product contained some tarry by-product formed in the nitration step.

The oily mixture was purified by first distilling, under a high vacuum, the low boiling by-products and the 3 and 5-nitro guaiacol acetates, leaving the high boiling tar as a residue in the distilling flask. The distillate was then fractionated and the fractions consisted of an unidentified low boiling material, 3-nitro guaiacol acetate, and 5-nitro guaiacol acetate. Several distillations were necessary to obtain the two isomers in a pure form. The 3-nitro guaiacol acetate was an oil boiling at 88–90° C./1 mm. (approx.) and the 5-nitro guaiacol acetate was a white crystalline solid boiling at 134–138° C./1 mm. (approx.) and melting at 104–105° after recrystallization from a mixture of ligroin and benzene. The combined yield of 3 and 5-nitro guaiacol acetates was 83% of the theoretical consisting of about 1 part of the 3-nitro guaiacol acetate to 3 parts of the 5-nitro guaiacol acetate.

To hydrolyze the 3-nitro guaiacol acetate, 9 grams thereof was boiled with 90 cc. of a 10% sodium hydroxide solution until all of the oil had dissolved. The solution was cooled, acidified with hydrochloric acid, and 6.3 grams,—a yield of 87%,—of 3-nitro guaiacol (II) was obtained. After two recrystallizations from ligroin, the melting point was 70–71° C. (corr.).

To hydrolyze the 5-nitro guaiacol acetate, 300 grams thereof was heated with 3000 cc. of a 10% sodium hydroxide solution on a water bath until all of the oil was in solution. The solution was then cooled in an ice bath to about 5° C. and the solid sodium salt of 5-nitro guaiacol which settled out was filtered off, washed with cold saturated sodium chloride solution, dissolved in warm water, filtered to remove impurities, and acidified with hydrochloric acid. The crystals of 5-nitro guaiacol which precipitated out were filtered off, washed well with cold water, and dried. Wt. 193 grams, 80% of the theoretical yield. M. P. 95–101° C. Recrystallized twice from a benzene-ligroin mixture, the 5-nitro guaiacol melted at 104–104.5° C. (corr.).

The step of mercurating the 5-nitro guaiacol was performed as follows:

A solution of 30 grams of 5-nitro guaiacol in 1 liter of water containing 25 cc. of a 10% sodium hydroxide solution was brought to a boil and to it was added a hot solution of 120 grams of mercuric acetate (a small excess) in about 800 cc. of water containing 10 cc. of acetic acid. The reaction mixture became acid and a precipitate began to form at once. The mixture was stirred and refluxed for 2½ hours after which it was made alkaline with a 10% sodium hydroxide solution to dissolve the product. A good deal of unreacted mercury salts precipitated out. The solution was made distinctly acid with acetic acid and refluxed for another 4 hours. At the end of this time, the mixture was cooled, the acid salt solution was decanted, the precipitate diluted to about 400 cc. with water, made alkaline with sodium hydroxide, and boiled. The insoluble impurities were filtered off, the clear red solution made acid with acetic acid, the mixture cooled, and the mercurated 5-nitro guaiacol was washed several times with water to remove the acid and salt, filtered off, washed with alcohol and ether, and dried. Wt. 74 grams. The reddish-brown product was purified further by several recrystallizations from acetic acid and the resulting bright yellow crystals of the acetoxymercuri derivatives of 5-nitro guaiacol were washed with ether and dried. Wt. 54 grams. The product consisted essentially of diacetoxymercuri-5-nitro guaiacol with the probable structure

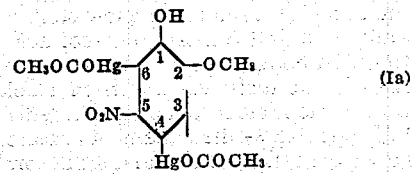
(Ia)

The diacetoxymercuri-5-nitro guaiacol, as prepared above, is bright yellow in color, is soluble in hot acetic acid and less so in cold acetic acid, and is soluble in dilute aqueous alkali. It is essentially insoluble in water, alcohol, ether, benzene, and most other organic solvents. It is somewhat soluble in ethylene and propylene glycols and is prepared in the latter as a solution for external and oral administration.

In preparing the diacetoxymercuri-5-nitro guaiacol for intravenous use, the compound was dissolved in dilute sodium hydroxide solution with boiling, filtered well through "celite" to remove any insoluble matter, and precipitated as a fine suspension with acetic acid. The fine crystals were allowed to settle out and then washed free of acid and salt with distilled water by decantation. Distilled water was then added to the crystals to bring the total amount to the required point; usually to make a 1-500 suspension. The product can also be precipitated with other acids (such as hydrochloric acid) or it can be put into solution by adjusting the pH to about 11 with sodium hydroxide. The so-prepared product is administrable intravenously.

There is evidence indicating that the compound is wholly or partially an anhydride of the diacetoxymercuri-5-nitro guaiacol. The product while not essentially soluble in water is soluble in blood serum.

The monomercurated derivatives (II) and (III) can be recovered from the acetic acid from which the dimercurated derivative has been recrystallized; or, they can be prepared in the same manner as the dimercurated derivative by using one-half the described amount of mercuric acetate.

The mercurated derivatives of 5-nitro guaiacol are difficult to identify by the usual methods in which the mercuri radical is replaced by bromine (Hantzsch and Auld, Berichte 39 (1906), 1114). Mercurated nitro phenols are usually identified by this procedure and this could suggest that, in the case of the mercurated derivatives of 5-nitro guaiacol, a mercuri group exists that is more tightly bound to the benzene nucleus than is the case in other mercurated nitro phenols and this, in turn, could possibly account for the lower toxicity.

What is claimed is:
4.6 diacetoxymercuri-5-nitro guaiacol.

JOHN A. COCHRAN,
*Administrator of the Estate of Edgar A. Peterson, Deceased.*